United States Patent
Li et al.

(10) Patent No.: US 11,214,737 B2
(45) Date of Patent: Jan. 4, 2022

(54) CHIRAL POLYMER MICROSPHERES WITH POROUS STRUCTURES AND MANUFACTURING METHOD THEREOF

(71) Applicant: Smart Liquid Crystal Technologies Co., Ltd., Suzhou (CN)

(72) Inventors: Ang Li, Suzhou (CN); Jiawei Lu, Suzhou (CN); Nicholas L. Abbott, Madison, WI (US)

(73) Assignee: Smart Liquid Crystal Technologies Co., Ltd., Suzhou (CN)

( * ) Notice: Subject to any disclaimer, the term of this patent is extended or adjusted under 35 U.S.C. 154(b) by 0 days.

(21) Appl. No.: 17/272,037

(22) PCT Filed: Sep. 19, 2019

(86) PCT No.: PCT/CN2019/106727
§ 371 (c)(1),
(2) Date: Feb. 26, 2021

(87) PCT Pub. No.: WO2020/063447
PCT Pub. Date: Apr. 2, 2020

(65) Prior Publication Data
US 2021/0309916 A1    Oct. 7, 2021

(30) Foreign Application Priority Data
Sep. 29, 2018    (CN) .......................... 201811149089.2

(51) Int. Cl.
| | | |
|---|---|---|
| *G02F 1/1333* | (2006.01) | |
| *C09K 19/58* | (2006.01) | |
| *G02F 1/1335* | (2006.01) | |
| *C09K 19/12* | (2006.01) | |
| *C09K 19/20* | (2006.01) | |
| *C09K 19/56* | (2006.01) | |
| *C09K 19/04* | (2006.01) | |
| *C09K 19/52* | (2006.01) | |

(52) U.S. Cl.
CPC ............ *C09K 19/586* (2013.01); *C09K 19/12* (2013.01); *C09K 19/20* (2013.01); *C09K 19/56* (2013.01); *G02F 1/133531* (2021.01); *C09K 2019/0448* (2013.01); *C09K 2019/122* (2013.01); *C09K 2019/2078* (2013.01); *C09K 2019/525* (2013.01)

(58) Field of Classification Search
CPC ...... C09K 19/586; C09K 19/12; C09K 19/20; C09K 19/56; C09K 2019/2078; C09K 2019/525; C09K 2019/122; C09K 2019/0448; G02F 1/133531; G02F 1/1333
See application file for complete search history.

(56) References Cited

U.S. PATENT DOCUMENTS 8,623,237 B2 * 1/2014 MacLachlan ........ B01D 71/027
252/299.01

FOREIGN PATENT DOCUMENTS

| DE | 4236935 A1 | 5/1994 |
| WO | 2011/123939 A1 | 10/2011 |

OTHER PUBLICATIONS

PCT Written Opinion, Application No. PCT/CN2019/106727, dated Dec. 17, 2019, 3 pages.

* cited by examiner

*Primary Examiner* — Geraldina Visconti
(74) *Attorney, Agent, or Firm* — Hoffmann & Baron, LLP (57) ABSTRACT

Chiral polymer microspheres have a porous structure of a concentric multi-shell structure. Each layer of the multi-shell structure is optically and structurally anisotropic. The optical axes of adjacent layers have a sequential slight twist. All layers of the multi-shell structure generate a helix configuration and the chiral polymer microspheres are optically active. A method for preparing the chiral polymer microspheres, includes: forming a homogeneous liquid crystal mixture; dispersing the liquid crystal mixture into a continuous phase to form liquid crystal droplets through an emulsification process; polymerizing the reactive liquid crystal to form intermediate microspheres; and removing the one non-reactive liquid crystal and the chiral additive to form the chiral polymer microspheres. The chiral polymer microspheres have a porous structure and a swelling ability, and can be used as the stationary phase in chiral chromatograph, improving separation efficiency.

11 Claims, 10 Drawing Sheets

CHIRAL POLYMER MICROSPHERES WITH POROUS STRUCTURES AND MANUFACTURING METHOD THEREOF

CROSS-REFERENCE TO RELATED APPLICATIONS

This application is the National Stage of International Application No. PCT/CN2019/106727, filed Sep. 19, 2019, which claims the benefit of Chinese Application No. 201811149089.2, filed Sep. 29, 2018, the contents of which is incorporated by reference herein.

FIELD OF THE INVENTION

The present invention relates to polymer microspheres. More particularly, the invention relates to chiral polymer microspheres with a porous structure and their manufacturing method.

BACKGROUND OF THE INVENTION

Since chirality is an important characteristic of the materials, with the development of life science, the demand for optically pure substances keeps increasing, and thus the interest for chiral separation attracts more and more attention. While significant advancement has been made in technologies to separate chiral molecules as well as their identifications, there remains growing interest to separate a broader range of chiral molecules and more rapid identification of such molecules. At present, the common method for chiral separation is mainly chiral chromatography. By introducing a chiral environment into the chromatographic column, the adsorption of optical isomers in the column will be different, resulting in the separation of the optical isomers. Most of existing chiral chromatographic columns are constructed by bonding chiral groups, filling or coating chiral materials on the surface of stationary phases of the column. Among those stationary phases, the one with polysaccharide derivatives are widely used due to its good chiral separation performance and wide range of chiral recognition. However, since such chiral stationary phases are obtained by coating or chemical bonding, the content of polysaccharide derivatives is low and the bearing capacity is limited, which greatly limits their application in the field of large-scale preparation and separation.

Polymer microparticles are widely used in biochemical separation, reaction catalysis, bacterial detection and drug releasing due to their controllable size, shape and large specific surface area. In biochemical separation, as stationary phases of the chromatographic column, polymer microspheres have the advantages of good mechanical stability, high separation capacity, easy preparation and low production cost. As a chiral stationary phase, a chiral environment is formed on the surface of polymer microspheres through chiral groups bonding, filling or coating chiral materials, which also have disadvantages of a uniform distribution of chiral points and weak bearing capacity of chiral separation.

Therefore, there remains a need for providing chiral polymer microspheres, which is constructed not through chemical bonding or coating, but a simpler manufacturing method directly forming a chiral structure, therefore improving the bearing capacity and chiral separation effect.

SUMMARY OF THE INVENTION

In order to fulfill the above mentioned need, one objective of the present invention is to provide chiral polymer microspheres having a porous structure, which consist of a concentric multi-shell structure, wherein each layer of the multi-shell structure is optically and structurally anisotropic, the optical axes of adjacent layers have a sequential slight twist, all layers of the multi-shell structure generate a helical configuration between each other, and the chiral polymer microspheres are optically active.

In some embodiments, the chiral polymer microspheres have various swelling statuses while dispersed in different solvents. The solvents include water and organic solvents, such as tetrahydrofuran, toluene, ethanol, acetone, N,N-dimethylformamide.

In some embodiments, the average particle size of the chiral polymer microspheres in ethanol is 10 µm-150 µm.

Another objective of the present invention is to provide a method for preparing the chiral polymer microspheres, comprising:

(I) forming a homogeneous liquid crystal mixture, wherein the liquid crystal mixture comprises at least one reactive liquid crystal, at least one non-reactive liquid crystal, at least one chiral additive and at least one polymerization initiator;

(II) dispersing the liquid crystal mixture into a continuous phase to form liquid crystal droplets through an emulsification process;

(III) polymerizing the reactive liquid crystal to form intermediate microspheres;

(IV) removing the non-reactive liquid crystal and the chiral additive from the intermediate microspheres to form the chiral polymer microspheres.

In a preferred embodiment, the emulsification process is a membrane emulsification process.

In some embodiments, the continuous phase contains at least one liquid-crystal-droplets stabilizer. In a preferred embodiment, the liquid-crystal-droplets stabilizer is a surfactant.

In some embodiments, the way of polymerizing includes photo polymerization, thermal polymerization and radiation polymerization. In a preferred embodiment, the way of polymerizing is photo polymerization.

In some embodiments, the reactive liquid crystal is 5%-55% by weight of the liquid crystal mixture. In some embodiments, the chiral additive is 0.5%-3.5% by weight of the liquid crystal mixture.

In some embodiments, the non-reactive liquid crystal is a nematic liquid crystal.

The present invention discloses chiral polymer microspheres having a porous structure and an ability to swell in solvents, which make them as the stationary phase of chiral chromatography. Meanwhile, due to the special helical configuration of their structure, the chiral polymer microspheres generates optical activity not only on the surface but on the whole, thus increasing the number of chiral points, making them more stable and finally improving the results of chiral separation.

BRIEF DESCRIPTION OF THE DRAWINGS

These and other features and advantages of the present invention will be better understood by reference to the following detailed description of an illustrative embodiment of the present disclosure when read in conjunction with the accompanying drawings, wherein:

prepared according to an embodiment of the present invention (same scale bar for all images).

DETAILED DESCRIPTION OF THE INVENTION

The following description of the disclosed embodiments is provided in detail to enable any person skilled in the art to fully understand the present invention. However, it will be apparent to those skilled in the art to readily make or use the present invention without these specific details. In other examples, well-known structures and devices are shown in the block diagram. In this regard, the description of the different illustrative exemplary embodiments presented herein are for the purpose of illustration and description and are not intended to be exhaustive or limited to the inventive concept. Accordingly, the scope of the invention is not to be limited by the specific embodiments described above, and is subject only to the scope of the appended claims.

Abbreviations used in the present invention are listed below:

SPG membrane: Shirasu Porous Glass membrane

FIG. 10 is (a) parallel polars and (b) cross polars microscope images of chiral polymer microspheres in ethanol The present invention discloses chiral polymer microspheres having a porous structure, which consist of a concentric multi-shell structure. Each layer of the multi-shell structure is optically and structurally anisotropic and there is a sequential slight twist between the optical axes of adjacent layers, finally forming a helical configuration. Moreover, the helical configuration is a single-direction helix (left-handed or right-handed) which generates optical activity in the whole structure of the chiral polymer microsphere. Meanwhile, the chiral polymer microspheres have a porous structure both in interior and in exterior, providing them characteristic of gel and various swelling statuses when dispersed in different solvents. The average particle size of the chiral polymer microspheres in ethanol is 10 μm-150 μm.

In the present invention, the chiral polymer microspheres with a porous structure can be prepared by a liquid-crystal-assisted template polymerization method, including the following steps:

First, at least one reactive liquid crystal, at least one non-reactive liquid crystal, at least one chiral additive and at least one polymerization initiator are mixed in a certain ratio to form a uniform liquid crystal mixture. The reactive liquid crystal contains polymerizable groups and can be further polymerized in the presence of polymerization initiators, such as acrylate type liquid crystals (RM257), methacrylate type liquid crystals (HCM062), allyl type liquid crystals (HCM126) and so on. The mass percentage of the reactive liquid crystal to the liquid crystal mixture is 5%~55%. The non-reactive liquid crystal does not have polymerizable groups to further polymerize. The non-reactive liquid crystal may contain at least one nematic liquid crystal, such as a nematic liquid crystal 5CB or a nematic liquid crystals mixture E7. The chiral additive will induce helical twisting of nematic liquid crystals to form chiral nematic liquid crystals (cholesteric liquid crystals). The chiral additive is those normally used in the liquid crystal field, such as CB15, R811, R1011, S1011 and R5011. The mass percentage of the chiral additive to the liquid crystal mixture is 0.5%~3.5%.

Figure 1:
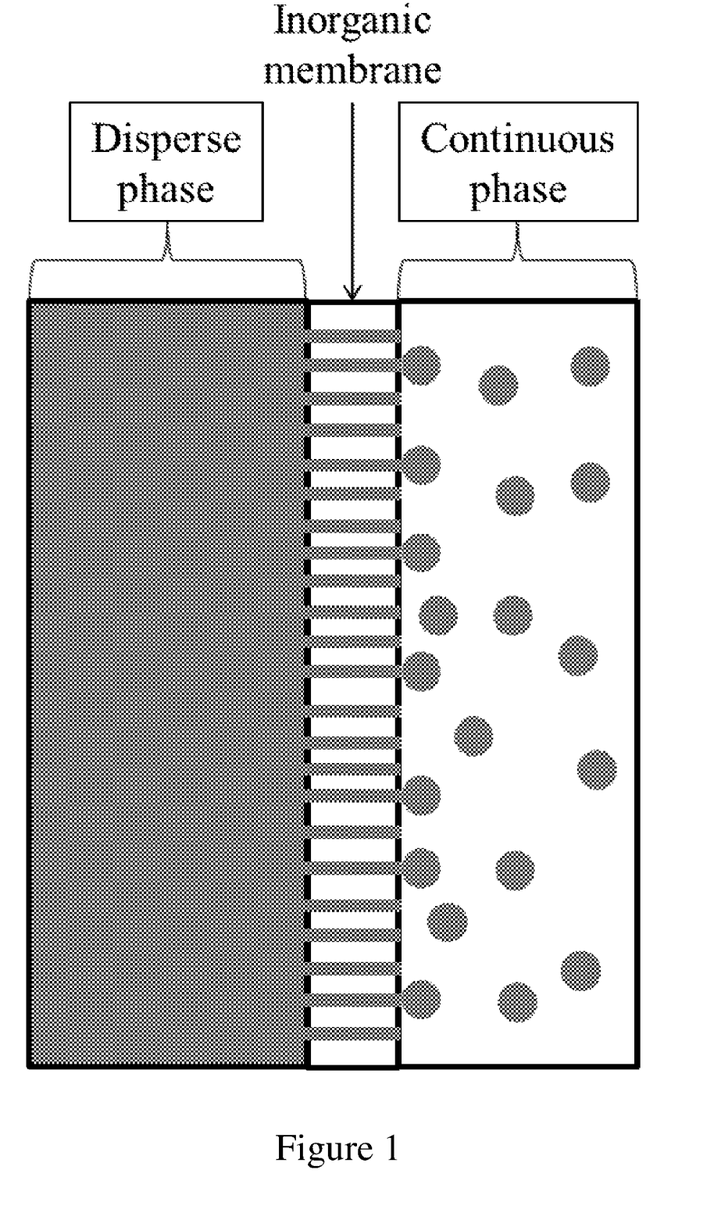
FIG. 1 is a schematic, illustrative view of a membrane emulsification technology for preparing liquid crystal droplets.

After that, the liquid crystal mixture is dispersed into a continuous phase to form liquid crystal droplets through an emulsification process, where the liquid crystal droplets include the liquid crystal mixture. The continuous phase can be water. The method of the emulsification process includes stirring, shaking, ultrasonic and membrane emulsification. In order to better control the particle size and size distribution of the liquid crystal droplets, the membrane emulsification is used, where the liquid crystal mixture is pushing into a continuous phase to form monodispersed liquid crystal droplets through a membrane emulsifier device. The principle of the membrane emulsifier device is shown in FIG. 1, which mainly uses a membrane-based dispersion technique to achieve the preparation of monodisperse liquid crystal droplets. In detail, the liquid crystal mixture as a dispersed phase is slowly passed through a micro porous inorganic membrane, and the liquid crystal mixture is extruded from the micropores of the inorganic membrane to form liquid crystal droplets dispersed into the continuous phase, thereby forming a dispersing system with the liquid crystal droplets as the disperse phase. The size of the liquid crystal droplets can be controlled by the pore size of the inorganic membrane to finally control the particle size of the chiral polymer microspheres. In the following examples, we chose a membrane emulsifier device using a micro porous SPG membrane to precisely control the particle size of the liquid crystal droplets. The continuous phase contains a liquid-crystal-droplets stabilizer, assisting the liquid crystal droplets better dispersing and maintaining in the continuous phase. The liquid-crystal-droplets stabilizer may be a surfactant, such as an ionic surfactant: SDS, a nonionic surfactant: PVP, PVA, PEG or Pluronic. The liquid-crystal-droplets stabilizer may also be a thickening agent miscible with water, for example, glycerin. In the following examples, the liquid-crystal-droplets stabilizer is PVA, whose mass concentration in the continuous phase is 0.5%~10%.

Figure 2:
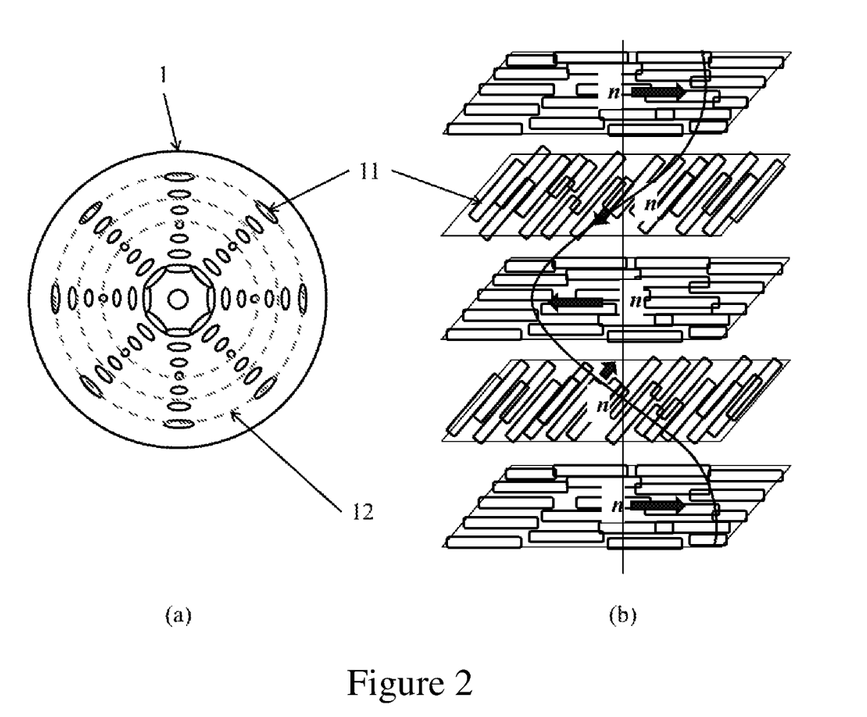
FIG. 2 is a schematic, illustrative view of the multi-layer structures of (a) a liquid crystal droplet and (b) cholesteric liquid crystals.

Next, the reactive liquid crystals in the liquid crystal droplets are polymerized to form intermediate microspheres containing the unreacted non-reactive liquid crystals. As shown in FIG. 2(a), before polymerization, liquid crystal molecules 11 in the liquid crystal droplets (including the reactive liquid crystals and the non-reactive liquid crystals) are twisted to form chiral nematic liquid crystals (cholesteric liquid crystals) under the inducing of the chiral additive. As shown in FIG. 2(b), cholesteric liquid crystal molecules are elongated rod-like and tend to form parallel layers, where the molecules are aligned parallel to each other and parallel to the plane of the layers. There is a slight twisting angle between the long axes of molecules in adjacent layers, which continues to form a helical structure. In the liquid crystal droplets, the chiral nematic liquid crystals are aligned to form helical layers in same way, but the helical axes tent to be perpendicular to the surface of the liquid crystal droplets due to surface anchoring energy, resulting in multiply concentric layers 12. After polymerization, the reactive liquid crystals in the concentric layers 12 are polymerized to generate a concentric multi-shell structure which maintains the helical configuration, finally forming intermediate microspheres with a helical configuration in the whole. Depending on the optical activity (left-handed or right-handed) of the chiral additive, the helical configuration it induced and the multi-shell structure of intermediate microspheres have the corresponding optical activity. The polymerization method may be photo polymerization, thermal polymerization or radiation polymerization. In the following examples, photo polymerization is preferably.

Finally, chiral polymer microparticles with a porous structure are further formed by removing the unreacted chemicals including the non-reactive liquid crystal and the chiral additive. Even thought the chiral additive is removed, the chiral polymer microparticles still maintain the whole helical structure and the optical activity of the intermediate microspheres. Meanwhile, since the non-reactive liquid crystals do not participate in the polymerization reaction, removing of the non-reactive liquid crystals forms micropores inside the chiral polymer microspheres, whose distribution is influenced by the alignment of the liquid crystal molecules and tends to have a helical configuration. Due to these micropores, the prepared chiral polymer microspheres have various swelling statues when dispersed in different solvents, which include water and organic solvents, such as tetrahydrofuran, toluene, ethanol, acetone, N,N-dimethylformamide.

In conjunction with the following examples, the structure, optical activity and preparing method of the chiral polymer microspheres is described in detail. In the present invention, the percentages all refer to mass percentages, unless otherwise indicated.

In the following examples, the steps of preparing the liquid crystal mixture include: mixing the reactive liquid crystal, the non-reactive liquid crystal, the chiral additive and the polymerization initiator according to a certain ratio, heating the mixture above the clearing point of the liquid crystals to form a uniform liquid, mixing the liquid well and then slowly cooling it to room temperature to form a homogeneous liquid crystal mixture. If photo polymerization is adopted, since the photo polymerization initiator is sensitive to light, the liquid must be kept in dark during the cooling process.

In the following examples, the steps of preparing polymer microspheres includes: slowly and smoothly passing the homogeneous liquid crystal mixture through a SPG membrane emulsifier device and dispersing it into a continuous phase containing a surfactant where the stirring speed is 300 r/min, to finally form a emulsion of monodispersed liquid crystal droplets; placing the emulsion under a UV light source (the center wavelength is 365 nm) to process polymerization with continuous stirring, where the radiation intensity was 2.5 mW/cm² and the reaction time was 30 minutes; after polymerization, washing the reaction solution with ethanol 3 times, centrifuging it and removing the supernatant to obtain chiral polymer microspheres without the unreacted chemicals.

Example 1

Figure 3:
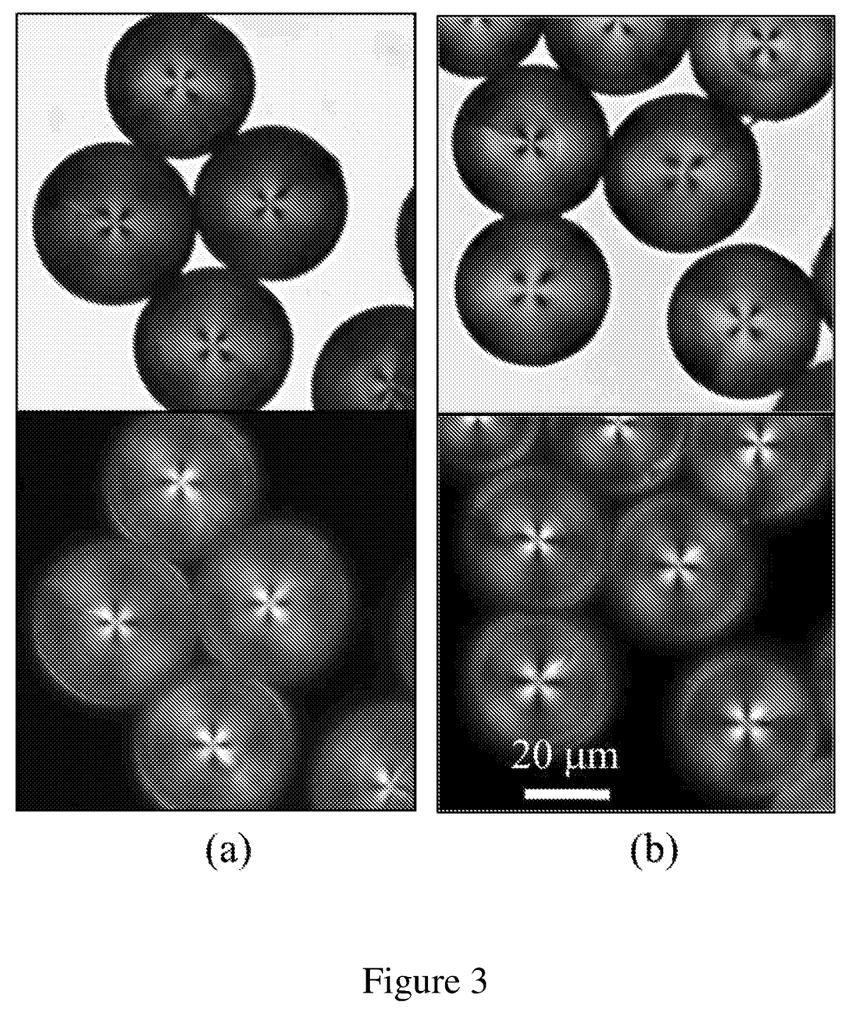
FIG. 3 is parallel polars (upper) and cross polars (lower) microscope images of chiral polymer microspheres in ethanol prepared with different chiral additives (a) R5011 and (b) S5011 (same scale bar for all images)
Figure 4:
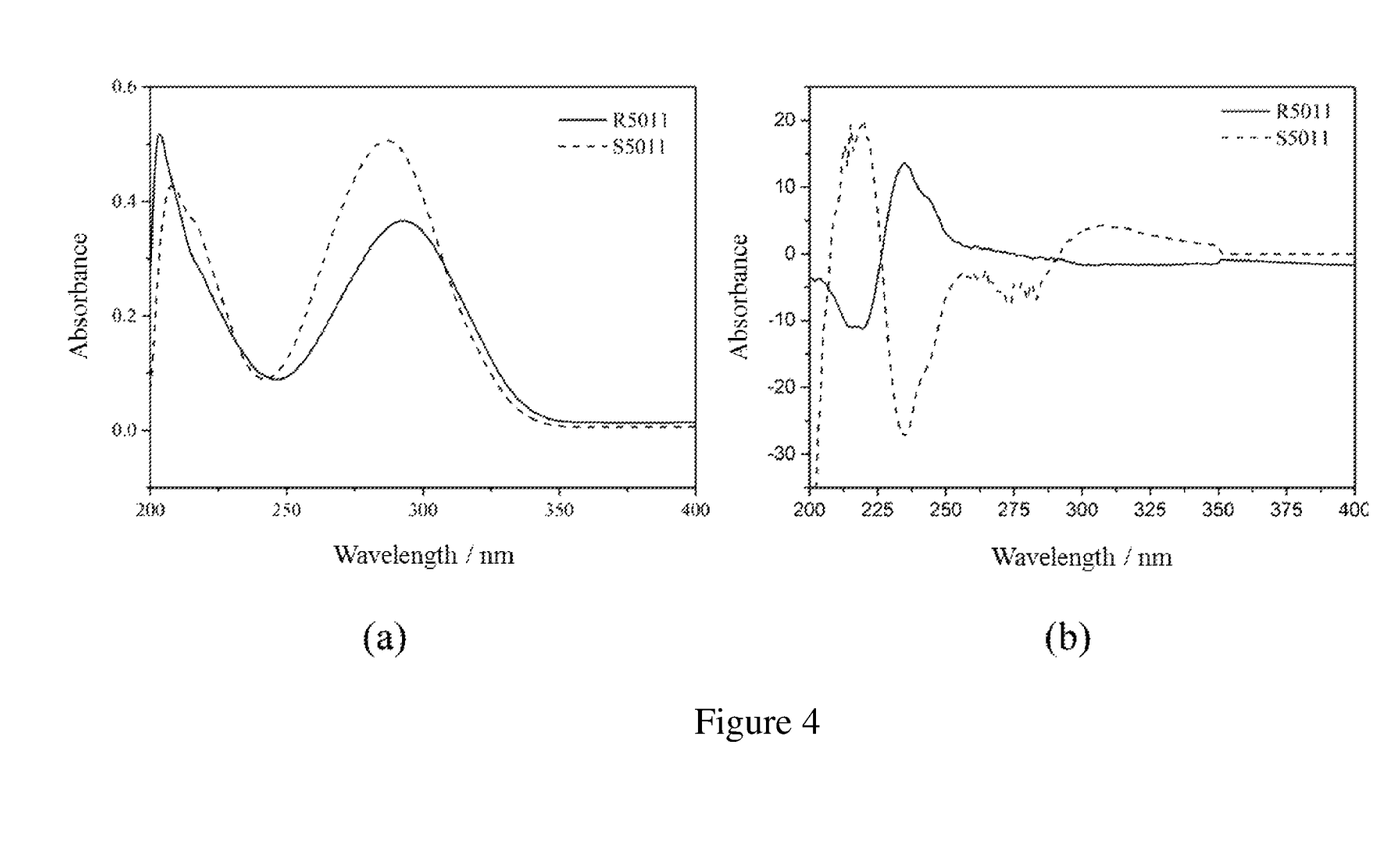
FIG. 4 is (a) UV-visible spectra and (b) circular dichroism spectra of chiral polymer microspheres prepared according to an embodiment of the present invention.

A liquid crystal mixture containing 3 g of a reactive liquid crystal RM257, 6.9 g of a nonreactive liquid crystal E7, 0.1 g of a chiral additive and 0.1 g of a photo polymerization initiator DMPAP (the percentage of the reactive liquid crystal is 29.7%) were prepared and then polymer microspheres were prepared according to above steps, where the pore diameter of the SPG membrane is 10 µm, the continuous phase is water and the mass percentage of PVA in water is 3.0%. The chiral additive is R5011 or S5011, where R5011 and S5011 have a similar molecule structure but opposite optical activities. As shown in FIG. 3, two prepared polymer microspheres have an average size of 40 µm when dispersed in ethanol. Since the concentric shells of the polymer microspheres are arranged along the radial direction, the polymer microspheres show a radial optical anisotropy (Maltese Black Cross) as well as the internal multi-layer structure. After that, their UV-visible spectra and circular dichroism (CD) spectra had been measured, as shown in FIGS. 4(a) and 4(b). For the chiral polymer microspheres prepared with chiral additives of opposite optical activities, their absorbance spectra are mainly similar, but their CD spectra are totally reversed. The results indicate the prepared polymer microspheres not only have optical activity (chirality), but also have a single-direction helix (left-handed or right-handed), which can be adjusted during the preparation by adding chiral additives of different optical activities.

Example 2

Figure 5:
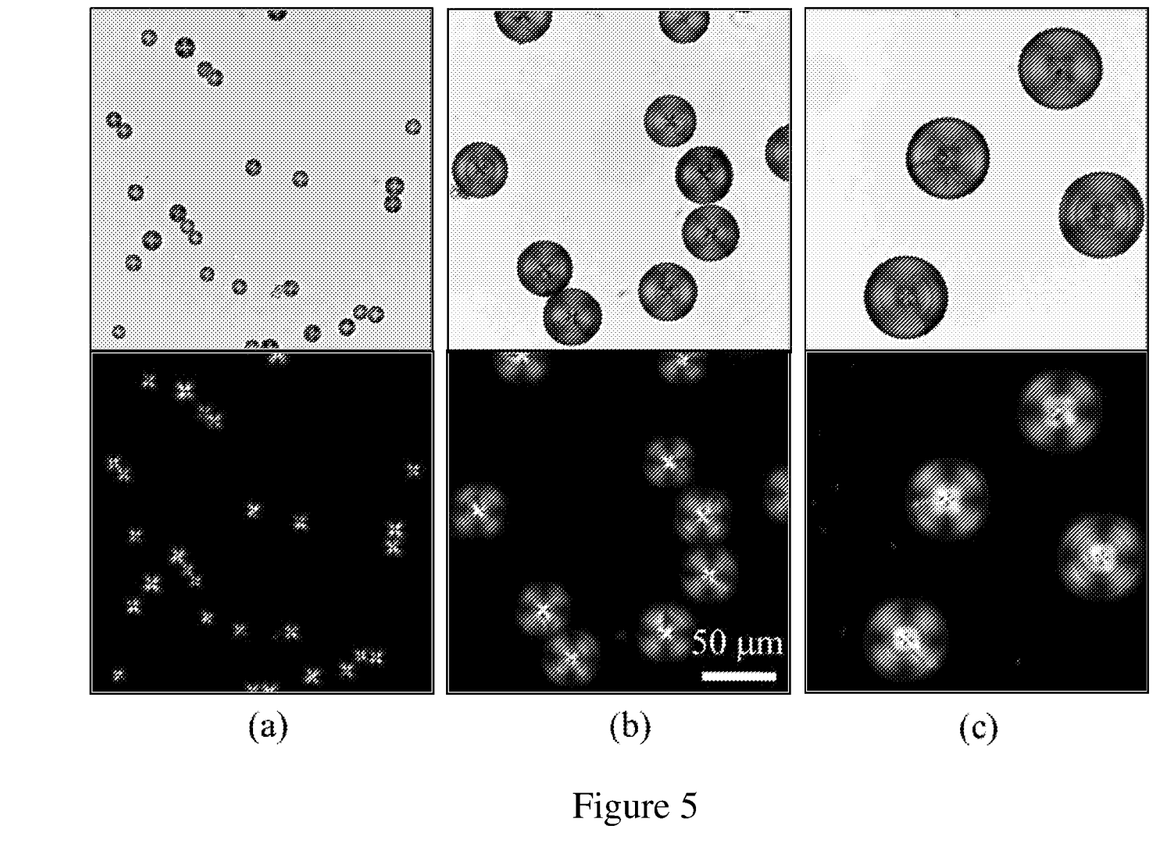
FIG. 5 is parallel polars (upper) and cross polars (lower) microscope images of chiral polymer microspheres in ethanol prepared with a membrane emulsification device of different pore sizes: (a) 2.8 μm, (b) 10 μm and (c) 20 μm (same scale bar for all images)
Figure 6:
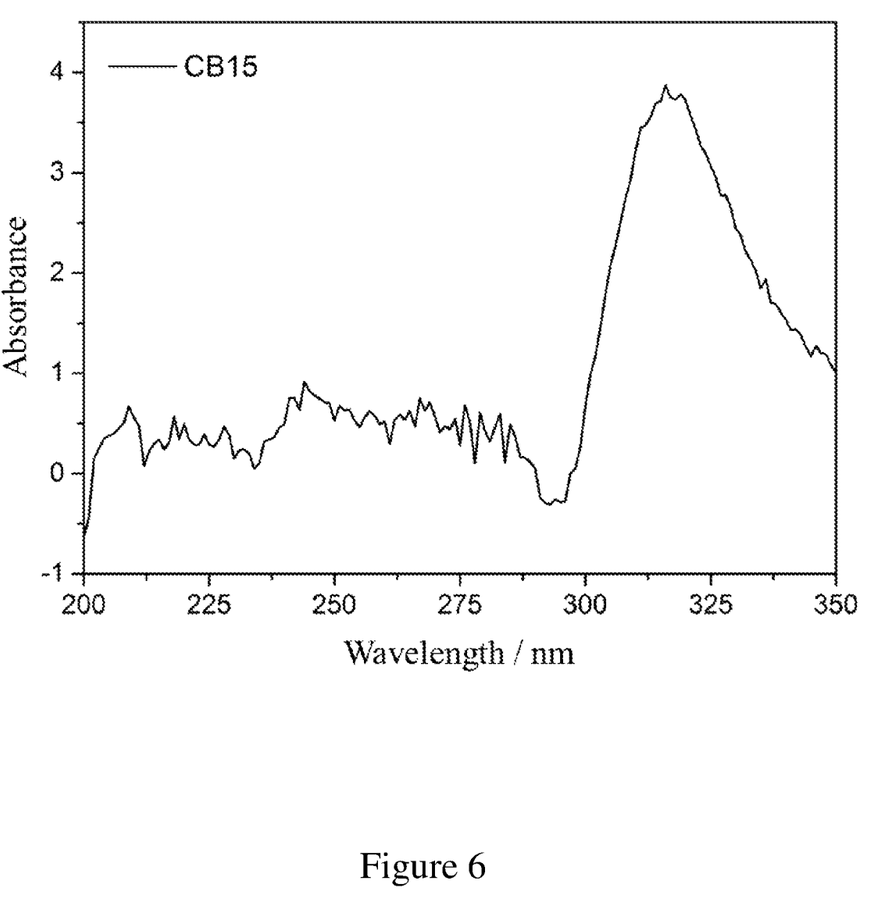
FIG. 6 is a circular dichroism spectrum of chiral polymer microspheres prepared according to an embodiment of the present invention.
Figure 7:
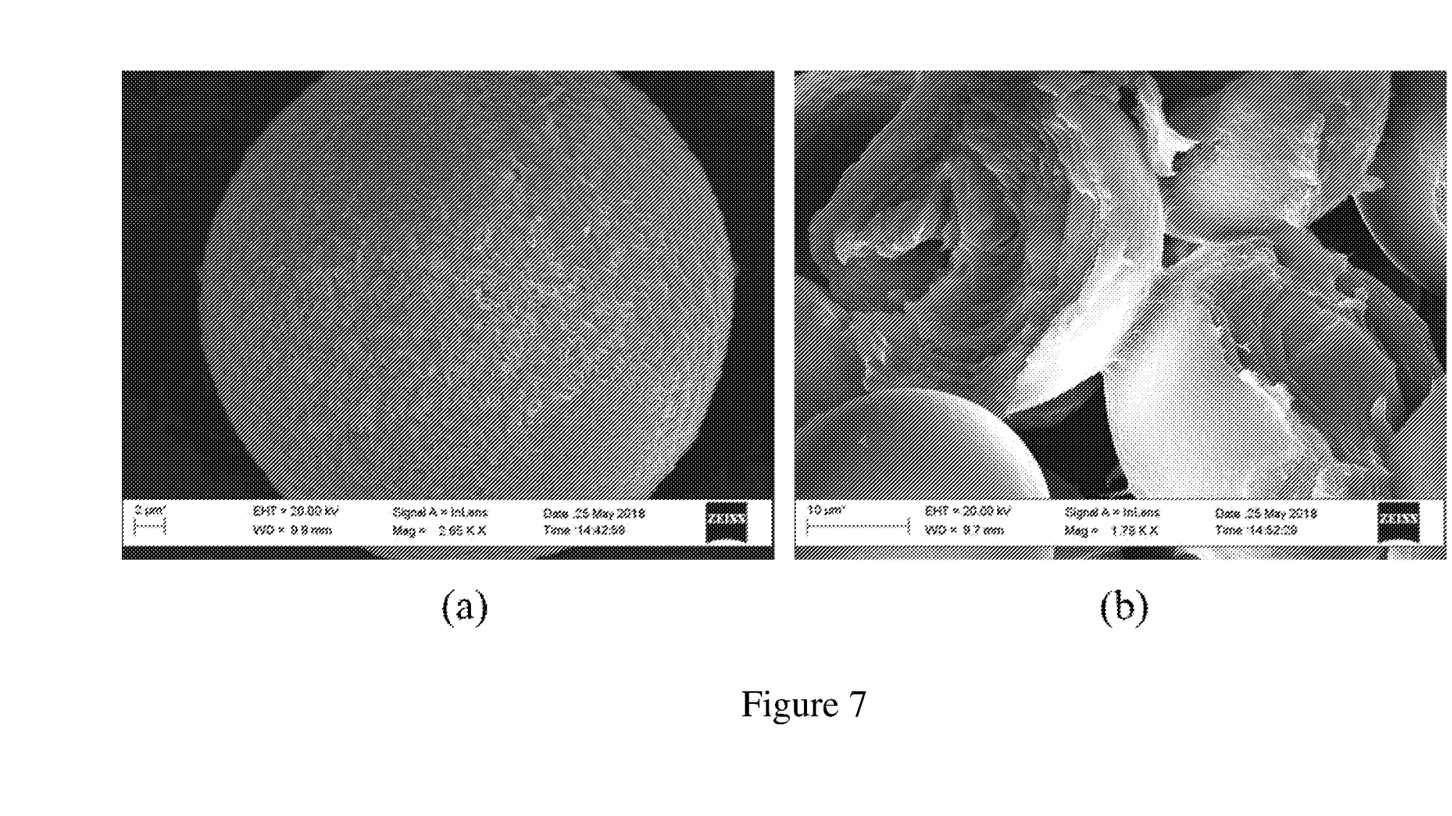
FIG. 7 is SEM images of (a) surface and (b) interior of a chiral polymer microsphere prepared according to an embodiment of the present invention.

A liquid crystal mixture containing 3 g of a reactive liquid crystal RM257, 6.67 g of a nonreactive liquid crystal E7, 0.33 g of a chiral additive CB15 and 0.1 g of a photo polymerization initiator DMPAP (the percentage of the reactive liquid crystal is 29.7%) were prepared and then polymer microspheres were prepared according to above steps, where the pore diameter of the SPG membrane is 10 µm, the continuous phase is water and the mass percentage of PVA in water is 3.3%. The prepared polymer microspheres have an average size of 40 µm when dispersed in ethanol. The microscope images (FIG. 5(b)) and CD spectrum (FIG. 6) indicate the concentric shells structure and the optical activity of right-handed. Meanwhile, as shown in FIG. 7, the SEM images show the porous and multi-layer structure.

On the other side, by keeping other reaction conditions same and changing the pore size of SPG membrane to 2.8 µm and 20 µm, the chiral polymer microspheres with average sizes of 12 µm and 55 µm in ethanol were prepared. FIG. 5(a) and FIG. 5(c) indicate the same optical activity and structure as the chiral polymer microspheres with an average size of 40 µm.

Example 3

Figure 8:
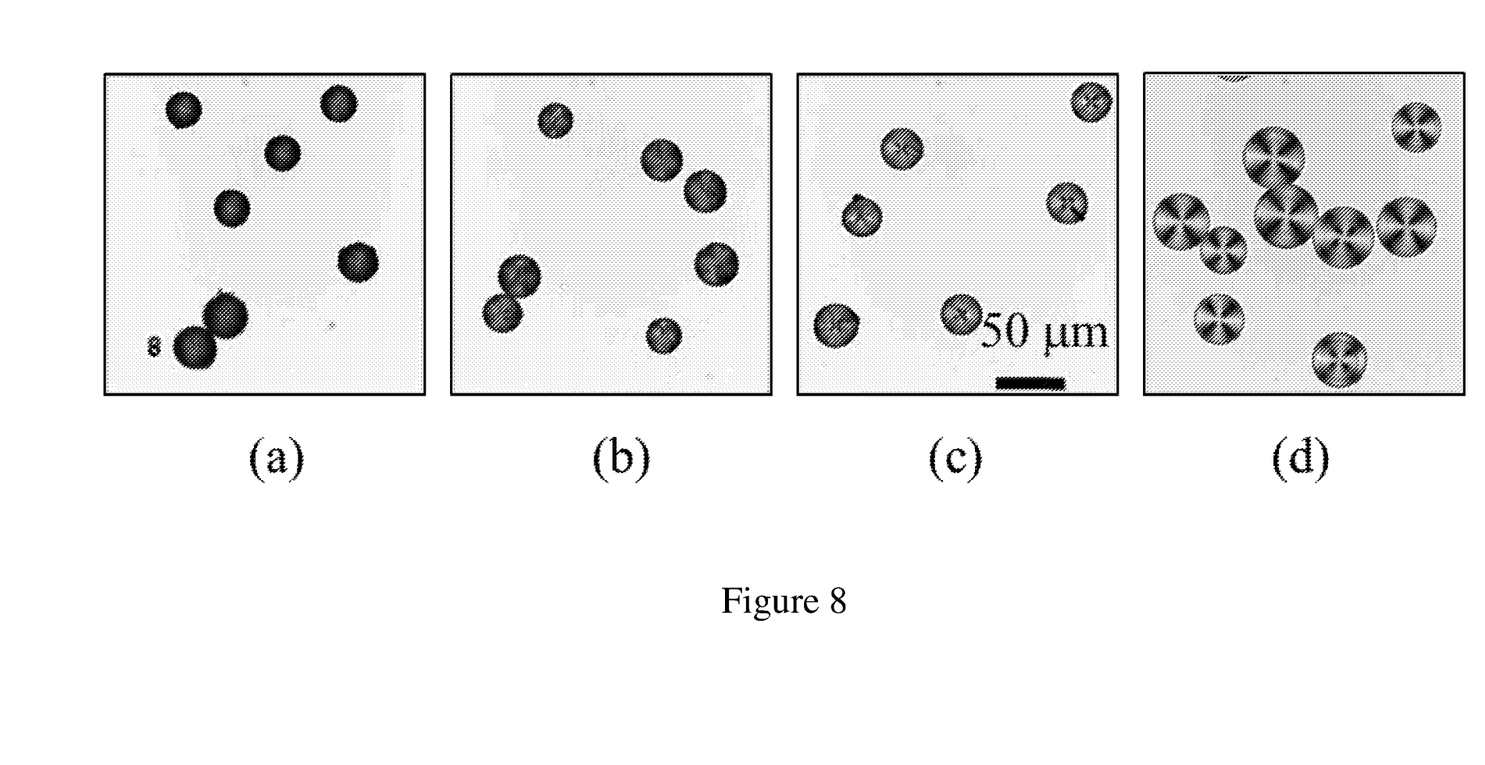
FIG. 8 is parallel polars microscope images of polymer microspheres in (a) dry condition, (b) deionized water, (c) ethanol and (d) tetrahydrofuran (same scale bar for all images)

A liquid crystal mixture containing 3 g of a reactive liquid crystal RM257, 6.9 g of a nonreactive liquid crystal E7, 0.1 g of a chiral additive CB15 and 0.1 g of a photo polymerization initiator DMPAP (the percentage of the reactive liquid crystal is 29.7%) were prepared and then polymer microspheres were prepared according to above steps, where the pore diameter of the SPG membrane is 10 µm, the continuous phase is water and the mass percentage of PVA in water is 3.0%. The prepared polymer microspheres have an average size of 40 µm when dispersed in ethanol. Since using same chiral additive as example 2, the prepared chiral polymer microspheres have small optical activity of right-handed. The polymer microspheres were dispersed in deionized water, ethanol and tetrahydrofuran. As shown in FIG. 8, the chiral polymer microspheres show different swelling statuses but same spherical shape, indicting the porous and concentric multi-shell structure which keeps spherical shape.

Example 4

Figure 9:
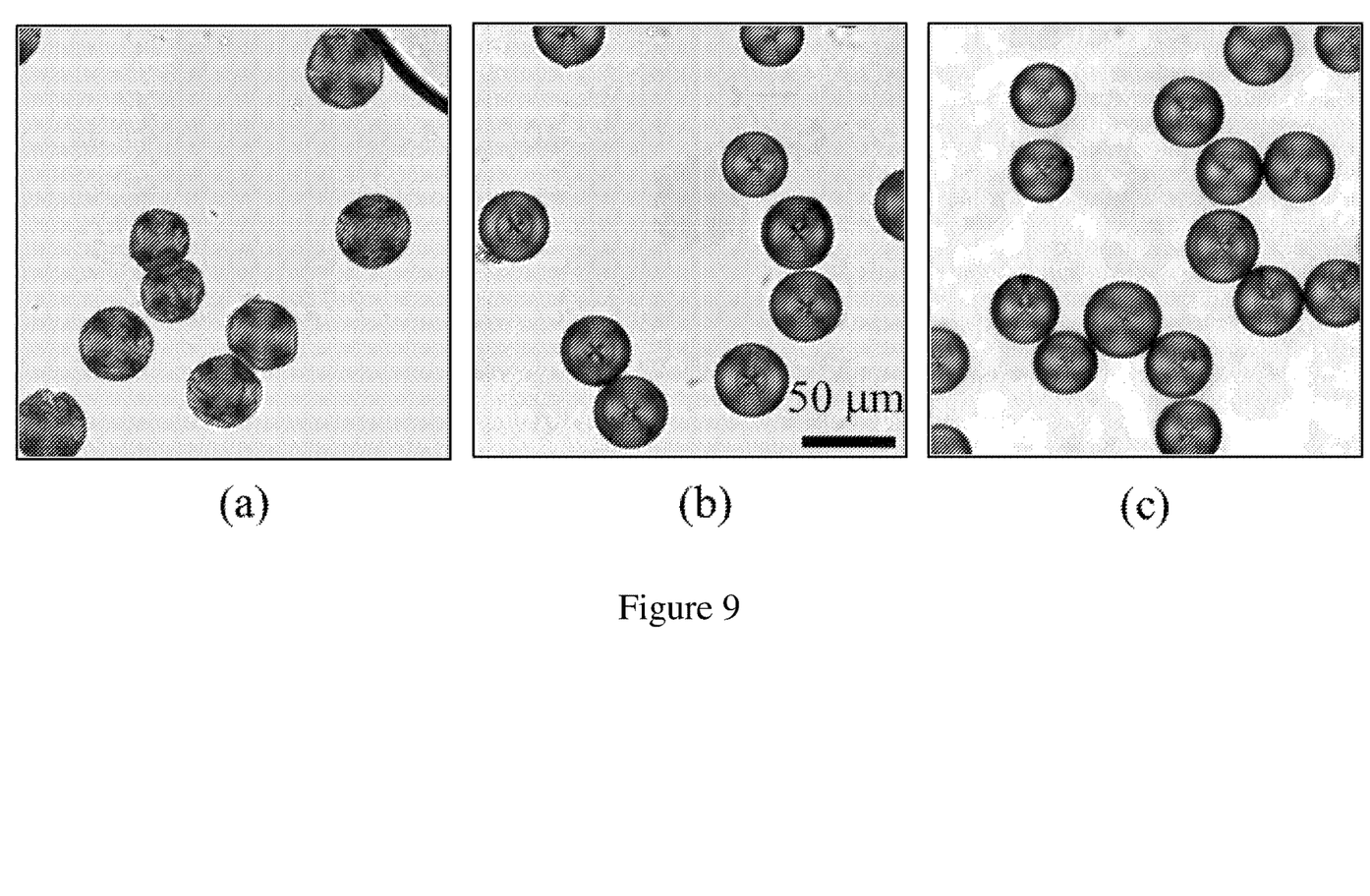
FIG. 9 is parallel polars microscope images of polymer microspheres prepared with different mass percentages of RM257: (a) 9.9%, (b) 29.7% and (c) 49.5% (same scale bar for all images)

A liquid crystal mixture containing a reactive liquid crystal RM257, a nonreactive liquid crystal E7, 0.1 g of a chiral additive CB15 and 0.1 g of a photo polymerization initiator DMPAP (total mass of RM257 and 5CB is 10 g and the mass percentage of RM257 to the total mass is 10%, 30% and 50%, in other word, the percentage of the reactive liquid crystal is 9.9%, 29.7% and 49.5%) were prepared and then polymer microspheres were prepared according to above steps, where the pore diameter of the SPG membrane is 10 µm, the continuous phase is water and the mass percentage of PVA in water is 3.0%. The prepared polymer microspheres have an average size of 40 µm when dispersed in ethanol, as shown in FIG. 9. Since using same chiral additive as example 2, the prepared chiral polymer microspheres have small optical activity of right-handed.

Example 5

Figure 10:
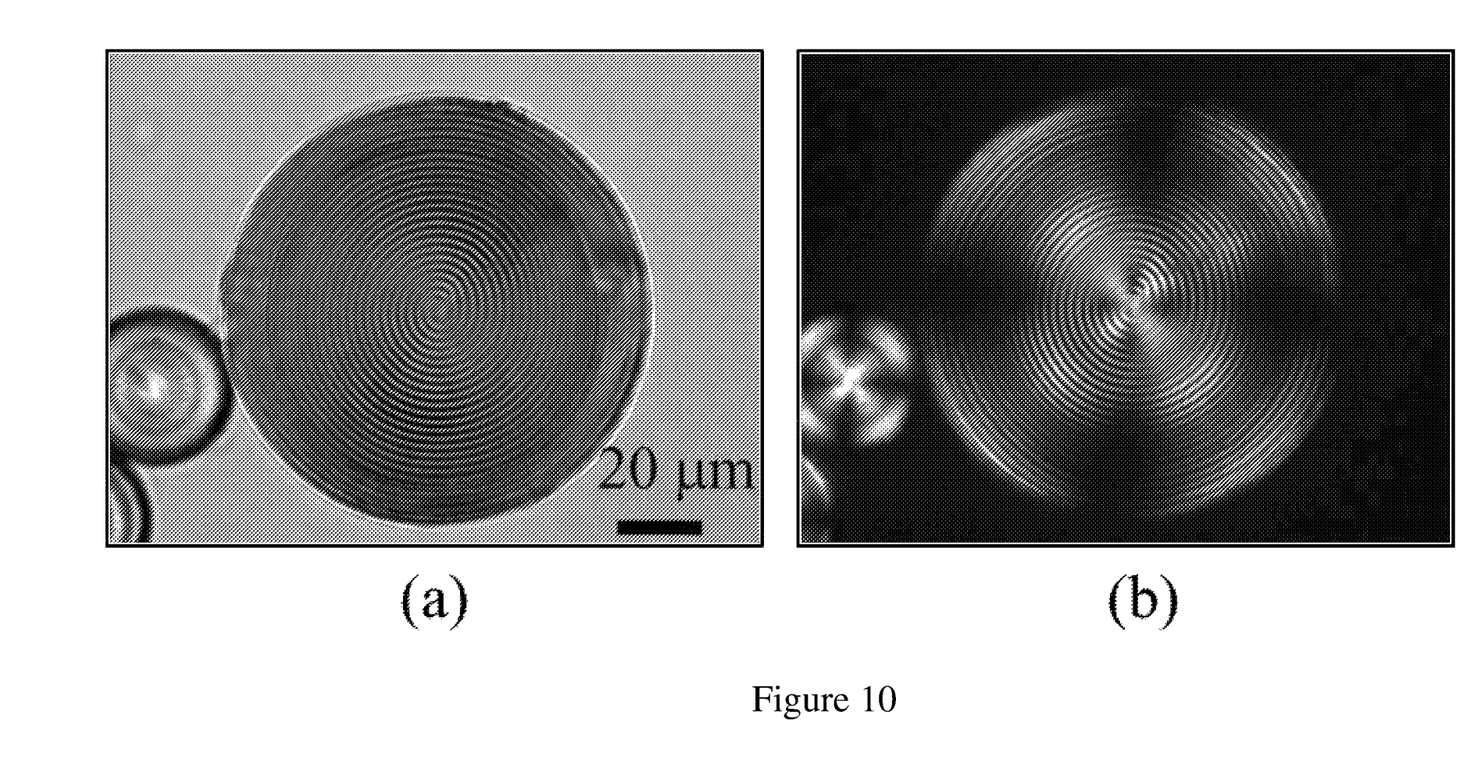

A liquid crystal mixture containing 5 g of a reactive liquid crystal RM257, 4.9 g of a nonreactive liquid crystal E7, 0.1 g of a chiral additive CB15 and 0.1 g of a photo polymerization initiator DMPAP (the percentage of the reactive liquid crystal is 49.5%) were prepared and then polymer microspheres were prepared according to above steps, where the pore diameter of the SPG membrane is 50 µm, the continuous phase is water and the mass percentage of PVA in water is 3.0%. The prepared polymer microspheres have an average size of 120 µm when dispersed in ethanol, as shown in FIG. 10. Since using same chiral additive as example 2, the prepared chiral polymer microspheres have small optical activity of right-handed.

While several particular exemplary embodiments have been described above in detail, the disclosed embodiments are considered illustrative rather than limiting. Those skilled in the art will readily realize that alternatives, modifications, variations, improvements, and substantial equivalents are possible without substantially departing from the novelty spirits or scope of the present disclosure. Thus, all such alternatives, modifications, variations, improvements, and substantial equivalents are intended to be embraced within the scope of the present disclosure as defined by the appended claims.

INDUSTRIAL APPLICABILITY

The method of the present invention can be applied to the field of polymer.

The invention claimed is:

1. Chiral polymer microspheres having a porous structure, consisting of a concentric multi-layered shell structure, wherein each layer of the multi-layered shell structure is optically and structurally anisotropic, the optical axes of adjacent layers of the multi-layered shell structure have a sequential slight twist, all layers of the multi-layered shell structure generate a helical configuration, and the chiral polymer microspheres are optically active.

2. The chiral polymer microspheres of claim 1, wherein the chiral polymer microspheres have a swelling capacity when dispersed in a solvent.

3. The chiral polymer microspheres of claim 1, wherein the average particle size of the chiral polymer microspheres in ethanol is 10 µm to 150 µm.

4. A method for preparing the chiral polymer microspheres of claim 1, comprising:
(I) forming a homogeneous liquid crystal mixture, wherein the liquid crystal mixture comprises at least one reactive liquid crystal, at least one non-reactive liquid crystal, at least one chiral additive and at least one polymerization initiator;
(II) dispersing the liquid crystal mixture into a continuous phase to form liquid crystal droplets through an emulsification process;
(III) polymerizing the reactive liquid crystal to form intermediate microspheres; and
(IV) removing the non-reactive liquid crystal and the chiral additive from the intermediate microspheres to form the chiral polymer microspheres.

5. The method of claim 4, wherein the emulsification process is a membrane emulsification process.

6. The method of claim 4, wherein the continuous phase contains at least one liquid-crystal-droplets stabilizer.

7. The method of claim 6, wherein the liquid-crystal-droplets stabilizer is a surfactant.

8. The method of claim 4, wherein the reactive liquid crystal is 5% to 55% by weight of the liquid crystal mixture.

9. The method of claim 4, wherein the chiral additive is 0.5% to 3.5% by weight of the liquid crystal mixture.

10. The method of claim 4, wherein the non-reactive liquid crystal is a nematic liquid crystal.

11. The method of claim 4, wherein the way of polymerizing includes photo polymerization, thermal polymerization and radiation polymerization.

* * * * *